(12) United States Patent
Nakamoto et al.

(10) Patent No.: US 10,953,927 B2
(45) Date of Patent: Mar. 23, 2021

(54) VEHICLE SIDE STRUCTURE

(71) Applicant: Toyota Jidosha Kabushiki Kaisha, Toyota (JP)

(72) Inventors: Yoshiaki Nakamoto, Nisshin (JP); Naohiko Ueno, Nagoya (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 93 days.

(21) Appl. No.: 16/206,096

(22) Filed: Nov. 30, 2018

(65) Prior Publication Data
US 2019/0168813 A1 Jun. 6, 2019

(30) Foreign Application Priority Data
Dec. 4, 2017 (JP) .............................. JP2017-232837

(51) Int. Cl.
*B62D 25/04* (2006.01)
*B62D 29/00* (2006.01)

(52) U.S. Cl.
CPC ........... *B62D 25/04* (2013.01); *B62D 29/007* (2013.01)

(58) Field of Classification Search
CPC .............................. B62D 25/04; B62D 29/007
See application file for complete search history.

(56) References Cited

U.S. PATENT DOCUMENTS

| 2014/0232138 A1 | 8/2014 | Kanaguichi et al. |
| 2016/0236719 A1 | 8/2016 | Tanaka |
| 2019/0016392 A1* | 1/2019 | Lee .................. B62D 25/025 |

FOREIGN PATENT DOCUMENTS

| CN | 103813954 A | 5/2014 |
| DE | 10162825 A1 | 7/2003 |
| DE | 102012015463 A1 | 2/2014 |
| JP | 2016-147637 A | 8/2016 |

* cited by examiner

*Primary Examiner* — D Glenn Dayoan
*Assistant Examiner* — Melissa Ann Bonifazi
(74) *Attorney, Agent, or Firm* — Dinsmore & Shohl LLP

(57) ABSTRACT

A vehicle side structure includes a pillar upper portion, a pillar lower portion, a joining portion, and a constituent part. The pillar upper portion constitutes, in a side portion of a vehicle, an upper part in the vehicle up-down direction in a pillar outer panel. The pillar lower portion constitutes a lower part, in the vehicle up-down direction, of the pillar outer panel, and has a tensile strength lower than the pillar upper portion. In the joining portion, a first part including an upper end of the pillar lower portion is joined to a second part including a bottom end of the pillar upper portion in a state where the first part overlaps with an inner side of the second part. The constituent part is provided in the first part of the pillar lower portion, at a position above the bottom end in the vehicle up-down direction.

9 Claims, 9 Drawing Sheets

VEHICLE SIDE STRUCTURE

CROSS-REFERENCE TO RELATED APPLICATIONS

This application claims priority to Japanese Patent Application No. 2017-232837 filed on Dec. 4, 2017, which is incorporated herein by reference in its entirety.

BACKGROUND

1. Technical Field

The disclosure relates to a vehicle side structure.

2. Description of Related Art

Japanese Unexamined Patent Application Publication No. 2016-147637 (JP 2016-147637 A) describes the following vehicle side structure. That is, in the vehicle side structure of JP 2016-147637 A, a projection portion is provided in an outer wall portion of a pillar lower RF of a center pillar. The projection portion is placed so as to face a bottom end of a pillar outer RF in the vehicle width direction and is distanced inwardly in the vehicle width direction from the bottom end of the pillar outer RF.

SUMMARY

Here, in the vehicle side structure of JP 2016-147637, when the pillar lower RF is pushed inwardly in the vehicle width direction at the time of a side collision of the vehicle, a part of the pillar lower RF below the projection portion is bent inwardly in the vehicle width direction. This might increase an entry amount of the center pillar into a vehicle cabin.

The disclosure provides a vehicle side structure that can reduce an entry amount of a center pillar into a vehicle cabin at the time of a side collision of a vehicle.

A vehicle side structure according to a first aspect of the disclosure includes a pillar upper portion, a pillar lower portion, a joining portion, and a constituent part. The pillar upper portion constitutes, in a side portion of a vehicle, an upper part, in the vehicle up-down direction, of a pillar outer panel as an outer plate of a center pillar extending along the vehicle up-down direction, and the pillar upper portion is joined to a roof side rail extending along the vehicle front-rear direction. The pillar lower portion constitutes a lower part, in the vehicle up-down direction, of the pillar outer panel, the pillar lower portion is joined to a rocker extending along the vehicle front-rear direction, and the pillar lower portion has a tensile strength lower than the pillar upper portion. In the joining portion, a first part including an upper end of the pillar lower portion is joined to a second part including a bottom end of the pillar upper portion in a state where the first part overlaps with an inner side of the second part in the vehicle width direction. The constituent part is provided in the first part of the pillar lower portion, at a position above the bottom end in the vehicle up-down direction. And, the constituent part includes one of a projection projecting inwardly in the vehicle width direction or a hole in the pillar lower portion. The hole may be an elongate hole provided along the vehicle front-rear direction.

In the vehicle side structure according to the first aspect, the constituent part constituted by the projection projecting inwardly in the vehicle width direction or the hole is provided in the pillar lower portion constituting the lower part, in the vehicle up-down direction, of the pillar outer panel. Further, the tensile strength of the pillar lower portion is lower than the tensile strength of the pillar upper portion constituting the upper part, in the vehicle up-down direction, of the pillar outer panel.

On this account, at the time of a side collision of the vehicle, the pillar lower portion easily deforms inwardly in the vehicle width direction from the constituent part as a starting point. That is, a deformation (a J-shaped bending mode) easily occurs at the time of a side collision of the vehicle such that, while an upper part (a part above the constituent part) of the center pillar maintains a posture along the vehicle up-down direction, a lower part (a part below the constituent part) of the center pillar is bent inwardly in the vehicle width direction.

Here, the constituent part is placed above the bottom end of the pillar upper portion, in a part overlapping with the pillar upper portion, the part being the first part of the pillar lower portion. That is, a lower part of the pillar lower portion below the constituent part (a part bent inwardly in the vehicle width direction in the J-shaped bending mode) overlaps with the pillar upper portion. On this account, in comparison with a case where the lower part does not overlap with the pillar upper portion, a bending amount of the lower part is reduced. As a result, the entry amount of the center pillar into the vehicle cabin can be reduced.

Further, in the vehicle side structure according to the first aspect, the second part of the pillar upper portion may be provided with a low strength portion having a tensile strength lower than other parts of the pillar upper portion, the low strength portion being provided at a position above the bottom end in the vehicle up-down direction.

According to the above aspect, the low strength portion having a tensile strength lower than the other parts of the pillar upper portion is provided in the second part overlapping with the pillar lower portion of the pillar upper portion.

On this account, at the time of a side collision of the vehicle, the pillar upper portion easily deforms inwardly in the vehicle width direction from the low strength portion as a starting point. That is, at the time of a side collision of the vehicle, a deformation (a J-shaped bending mode) easily occurs such that, while the upper part (a part above the low strength portion) of the center pillar maintains a posture along the vehicle up-down direction, the lower part (a part below the low strength portion) of the center pillar is bent inwardly in the vehicle width direction.

Here, the low strength portion is placed above the bottom end of the pillar upper portion, in the second pan of the pillar upper portion. That is, a lower part of the pillar upper portion below the low strength portion (a part bent inwardly in the vehicle width direction in the J-shaped bending mode) has a tensile strength higher than the tensile strength of the low strength portion. On this account, in comparison with a case where the low strength portion is provided so as to include the lower part, a bending amount of the lower part is reduced. As a result, the entry amount of the center pillar into the vehicle cabin can be reduced.

Further, in the above aspect, the low strength portion may be placed so as to overlap with at least a part of the constituent part in a vehicle side view.

According to the above aspect, at the time of a side collision of the vehicle, the pillar upper portion and the pillar lower portion easily deform inwardly in the vehicle width direction from similar positions as starting points. On this account, in comparison with a case where the low strength portion is placed apart from the constituent part in a vehicle side view, the J-shaped bending mode easily occurs.

Further, in the above aspect, the low strength portion and the constituent part may be placed below a belt line of the vehicle in the vehicle up-down direction. Here, the belt line may be a line passing through a door-panel upper end of the vehicle.

According to the above aspect, at the time of a side collision of the vehicle, the pillar upper portion and the pillar lower portion easily deform inwardly in the vehicle width direction from a position below the belt line in the vehicle up-down direction. That is, a deformation easily occurs at the time of a side collision of the vehicle such that, while a part of the center pillar above the belt line maintains a posture along the vehicle up-down direction, a part of the center pillar below the belt line is bent inwardly in the vehicle width direction.

Accordingly, at the time of a side collision of the vehicle, a space can be secured in the vehicle cabin, at a position at least above the belt line.

Further, in the above aspect, the pillar lower portion may include a first edge line portion provided between an outer wall portion of the pillar lower portion, facing outward in the vehicle width direction, and a front wall portion overhanging inwardly in the vehicle width direction front a front end of the outer wall portion, and the pillar lower portion may include a second edge line portion provided between the outer wall portion and a rear wall portion overhanging inwardly in the vehicle width direction front a rear end of the outer wall portion. The constituent part may be provided in the first edge line portion and the second edge line portion.

According to the above aspect, the constituent part is provided in the first edge line portion and the second edge line portion, and therefore, in comparison with a case where the constituent part is provided only in the outer wall portion of the pillar lower portion, the pillar lower portion easily deforms inwardly in the vehicle width direction from the constituent part as a starting point. Accordingly, in comparison with a case where the constituent part is provided only in the outer wall portion of the pillar lower portion, a deformation (a J-shaped bending mode) easily occurs at the time of a side collision of the vehicle such that, while the upper part (a part above the constituent part) of the center pillar maintains a posture along the vehicle up-down direction, the lower part (a part below the constituent part) of the center pillar is bent inwardly in the vehicle width direction.

Furthermore, in the above aspect, the pillar upper portion may be made of a hot stamp material. Here, the hot stamp material may be manufactured by hot press working in which a steel sheet is pressed while the steel sheet is heated at a recrystallization temperature or more.

According to the above aspect, the hot stamp material is made by hot press working in which a steel sheet is pressed while the steel sheet is heated at a recrystallization temperature or more, so that the pillar upper portion can have an ultra-high tension (e.g., a tensile strength of 1500 MPa or more). On this account, the pillar upper portion can hardly deform. As a result, the entry amount of the center pillar into the vehicle cabin can be reduced.

According to the aspects of the disclosure, it is possible to yield such an excellent effect that the entry amount of the center pillar into the vehicle cabin can be reduced at the time of a side collision of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

One exemplary embodiment of the disclosure will hereinafter be described with reference to the drawings. Note that an arrow FR, an arrow UP, and an arrow OUT shown appropriately in each figure indicate the front side in the vehicle front-rear direction, the upper side in the vehicle up-down direction, and the outer side in the vehicle width direction, respectively. Further, the vehicle width direction is a direction along the right-left direction of a vehicle, directions directed from the center toward the opposite sides in the vehicle width direction are referred to as the outer side in the vehicle width direction, and their opposite directions are referred to as the inner side in the vehicle width direction. Further, in the following description, the front side, the rear side, the right side, the left side, the upper side, and the lower side of the vehicle may be expressed just as the front side, the rear side, die right side, the left side, the upper side, and the lower side.

Figure 1:
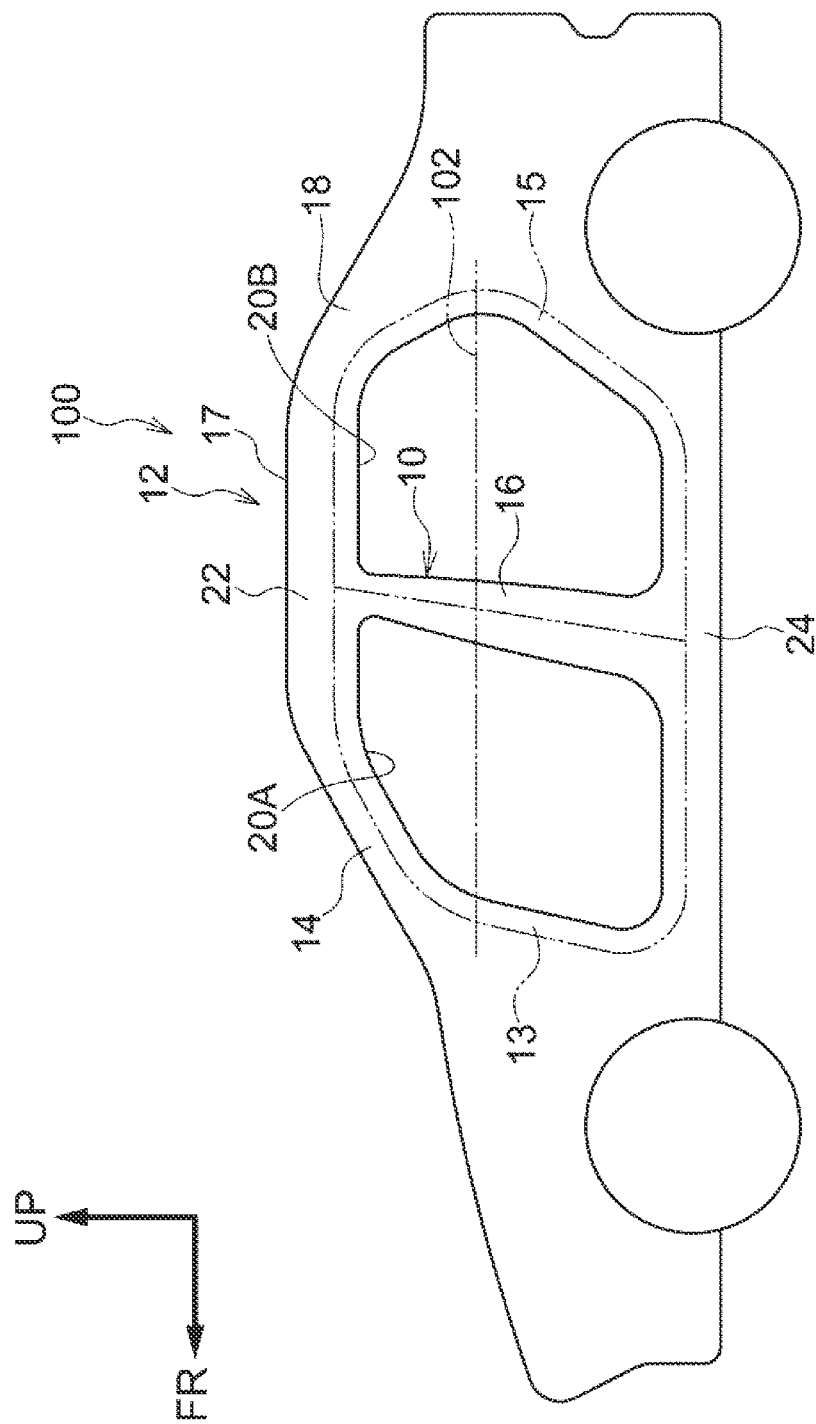
FIG. 1 is a side view schematically illustrating a side portion of a vehicle to which a vehicle side structure according to the present embodiment is applied.

The following describes a vehicle 100 to which a vehicle side structure 10 according to the present embodiment is applied. FIG. 1 is a side view schematically illustrating a side portion 12 of the vehicle 100 to which the vehicle side structure 10 according to the present embodiment is applied.

As illustrated in FIG. 1, the side portion 12 of the vehicle 100 is provided with a front pillar 14, a center pillar 16, and a rear pillar 18 disposed sequentially from the front side in the vehicle front-rear direction. Note that a pair of right and left front pillars 14, a pair of right and left center pillars 16, and a pair of right and left rear pillars 18 are provided such that the right and left front pillars 14, the right and left center pillars 16, and the right and left rear pillars 18 are provided on the opposite sides of the vehicle 100. The center pillar 16 is placed between a front-side-door opening 20A and a rear-side-door opening 20B provided in the side portion 12 of the vehicle 100 so as to extend along the vehicle up-down direction. That is, the center pillar 16 is a vehicle-body frame member in which its longitudinal direction is generally along the vehicle up-down direction.

A front side door 13 is attached to the front-side-door opening 20A, and a rear side door 15 is attached to the rear-side-door opening 20B. Further, a belt line 102 indicated by an alternate long and short dash line in FIG. 1 is set in the vehicle 100. The belt line 102 indicates a line passing through a bottom end of a side window of a side door (the front side door 13 and the rear side door 15) in the vehicle 100, namely, a door-panel upper end.

A roof side rail 22 extending along the vehicle front-rear direction is provided above the center pillar 16. An upper end of the center pillar 16 is joined to an intermediate part of the roof side rail 22 in the vehicle front-rear direction. The roof side rail 22 is a vehicle-body frame member placed on either side of a roof panel 17 constituting a roof portion of the vehicle such that its longitudinal direction is generally along the vehicle front-rear direction. That is, the roof side rail 22 is placed generally in the vehicle front-rear direction along respective upper edges of the front-side-door opening 20A and the rear-side-door opening 20B.

A rocker 24 extending along the vehicle front-rear direction is provided below the center pillar 16. A bottom end of the center pillar 16 is joined to an intermediate part of the rocker 24 in the vehicle front-rear direction. The rocker 24 is a vehicle-body frame member placed on either side of a lower part of the vehicle 100 such that its longitudinal direction is generally along the vehicle front-rear direction. That is, the rocker 24 is placed generally in the vehicle front-rear direction along respective lower edges of the front-side-door opening 20A and the rear-side-door opening 20B.

Figure 9:
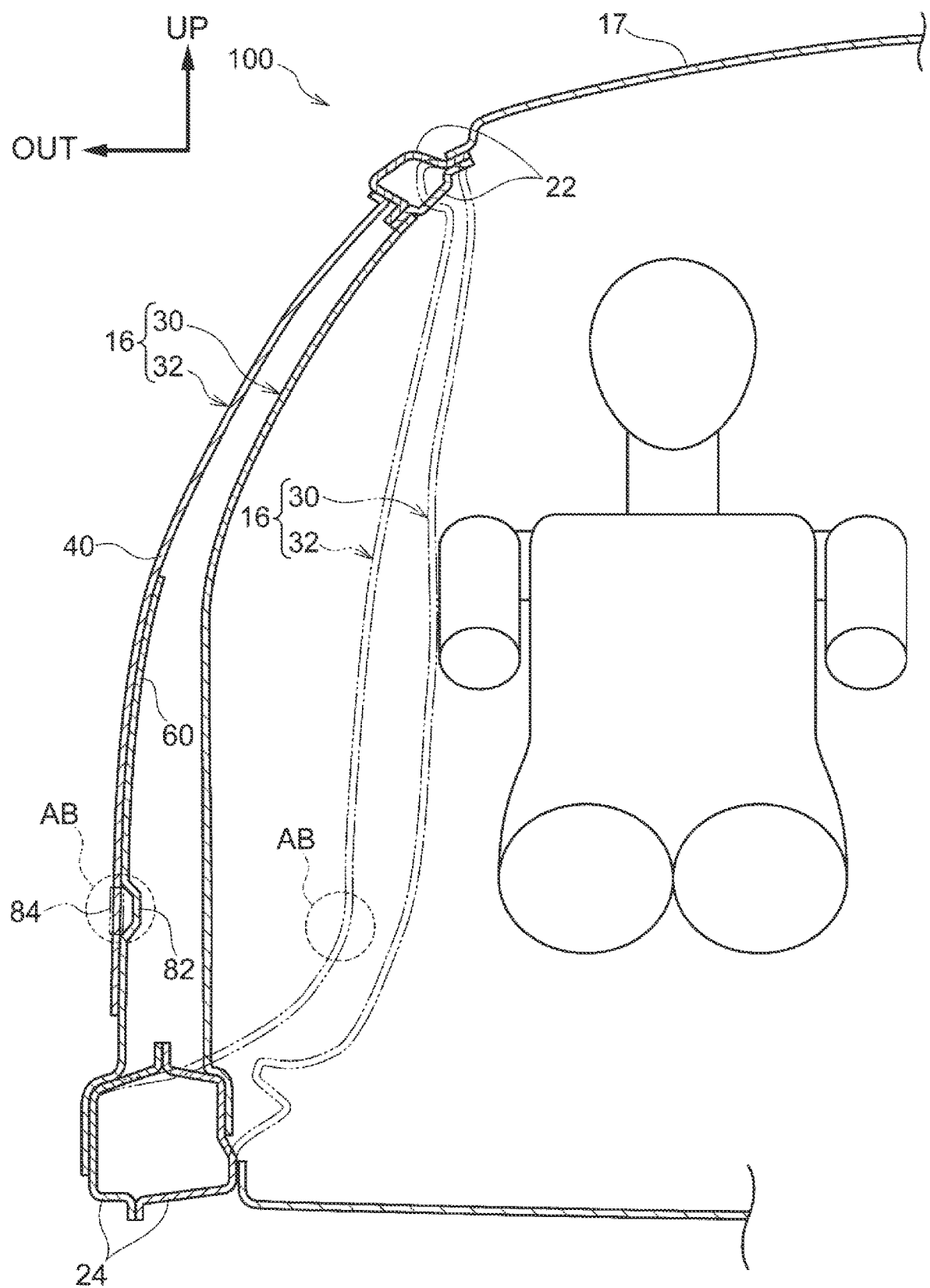
FIG. 9 is a view illustrating a center pillar before deformation due to a side collision of the vehicle and the center pillar after the deformation.

As illustrated in FIG. 9, the center pillar 16 includes a pillar inner panel 30 placed on the inner side in the vehicle width direction and a pillar outer panel 32 placed outward of the pillar inner panel 30 in the vehicle width direction. The pillar inner panel 30 constitutes an inner plate of the center pillar 16. The pillar outer panel 32 constitutes an outer plate of the center pillar 16.

The pillar inner panel 30 extends along the vehicle up-down direction and has a generally hat-shape opened outward in the vehicle width direction. The pillar outer panel 32 extends along the vehicle up-down direction and has s generally hat-shape opened inwardly in the vehicle width direction. A pair of flange portions (not shown) of the pillar inner panel 30 and a pair of flange portions (not shown) of the pillar outer panel 32 are joined to each other, so that the center pillar 16 has a closed-section structure.

Figure 2:
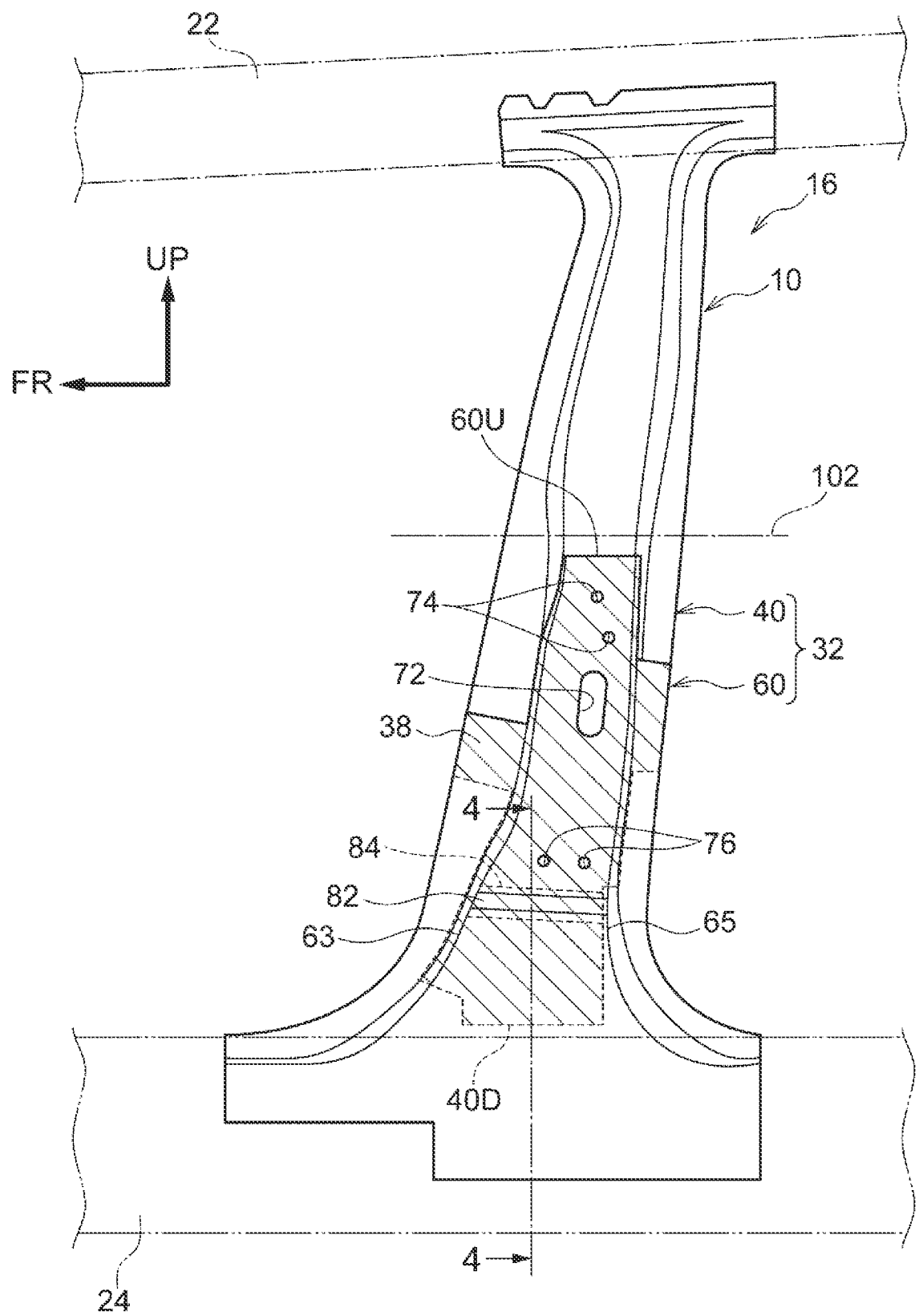
FIG. 2 is a side view of the vehicle side structure according to the present embodiment when it is viewed from the inside of the vehicle.
Figure 3:
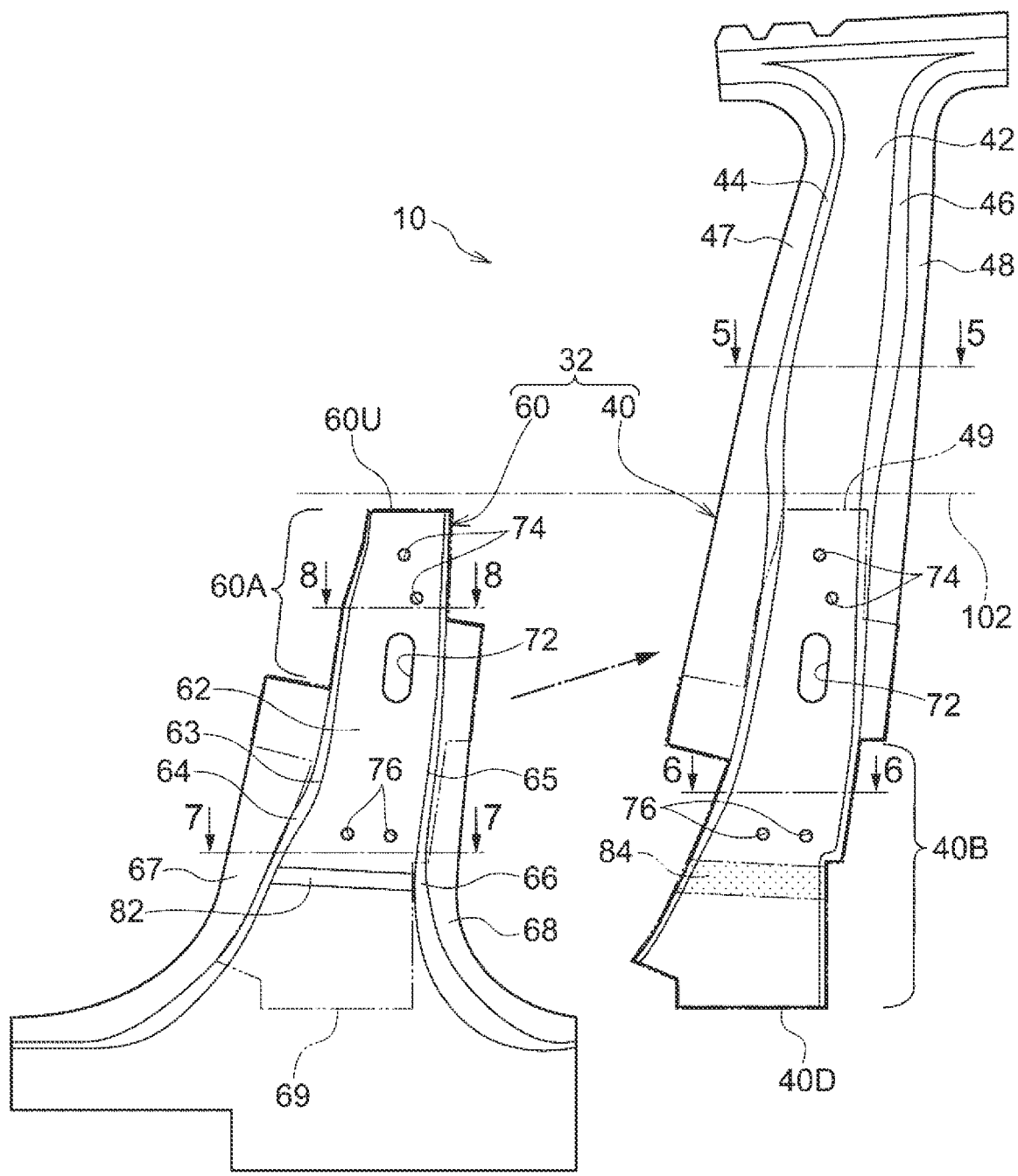
FIG. 3 is a side view illustrating component parts of the vehicle side structure illustrated in FIG. 2 in an exploded manner.
Figure 4:
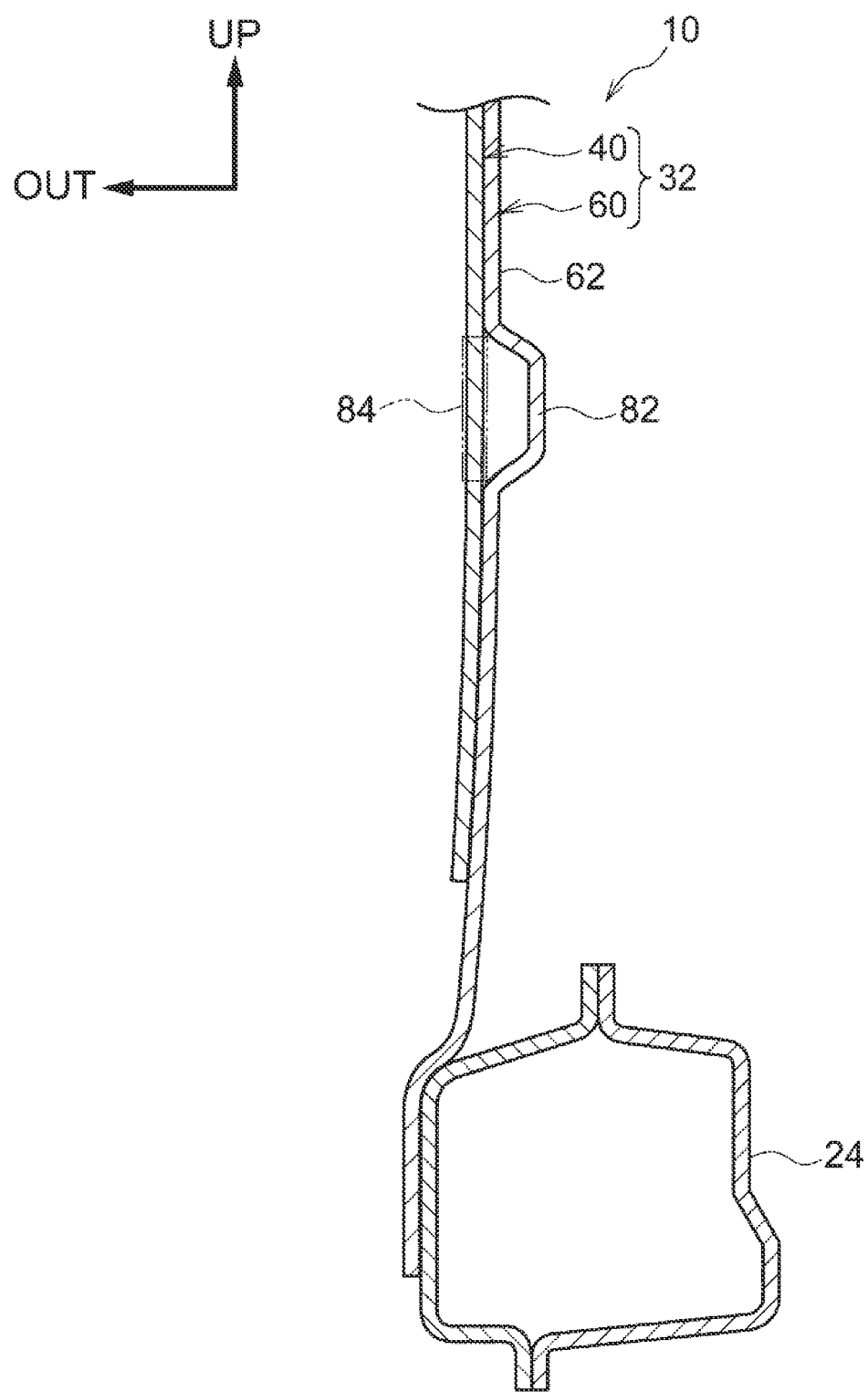
FIG. 4 is a front sectional view (a sectional view along a line 4-4 in FIG. 2) illustrating the vehicle side structure according to the present embodiment.
Figure 5:
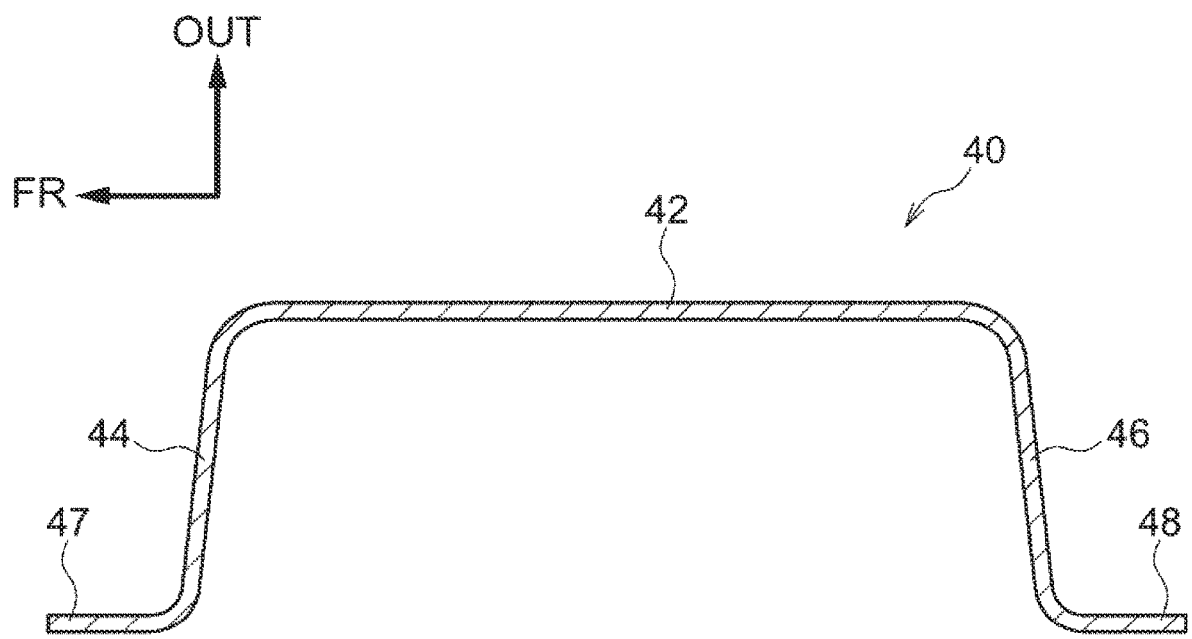
FIG. 5 is a plan sectional view (a sectional view along a line 5-5 in FIG. 3) of a pillar upper portion in the vehicle side structure according to the present embodiment.

The vehicle side structure 10 according to the present embodiment will be described below FIG. 2 is a side view of the vehicle side structure 10 when it is viewed from the inside of the vehicle 100. FIG. 3 is a side view illustrating component parts of the vehicle side structure 10 illustrated in FIG. 2 in an exploded manner. FIG. 4 is a front sectional view (a sectional view along a line 4-4 in FIG. 2) illustrating the vehicle side structure 10. FIG. 5 is a plan sectional view (a sectional view along a line 5-5 in FIG. 3) of a pillar upper portion 40 (described later) in the vehicle side structure 10.

Figure 6:
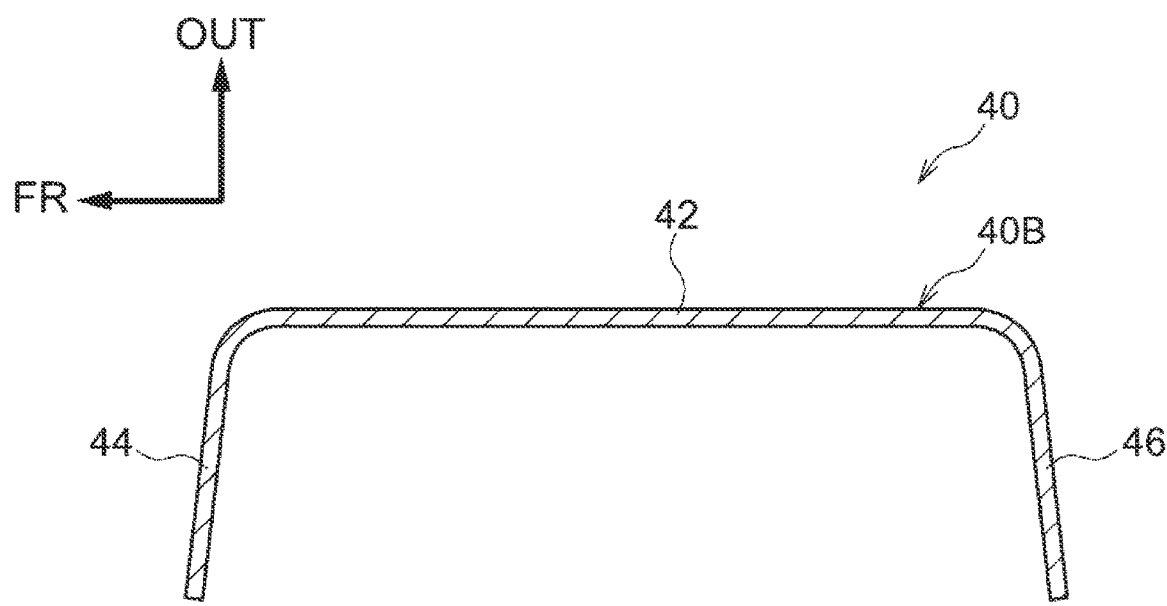
FIG. 6 is a plan sectional view (a sectional view along a line 6-6 in FIG. 3) of a lower part of the pillar upper portion in the vehicle side structure according to the present embodiment.
Figure 7:
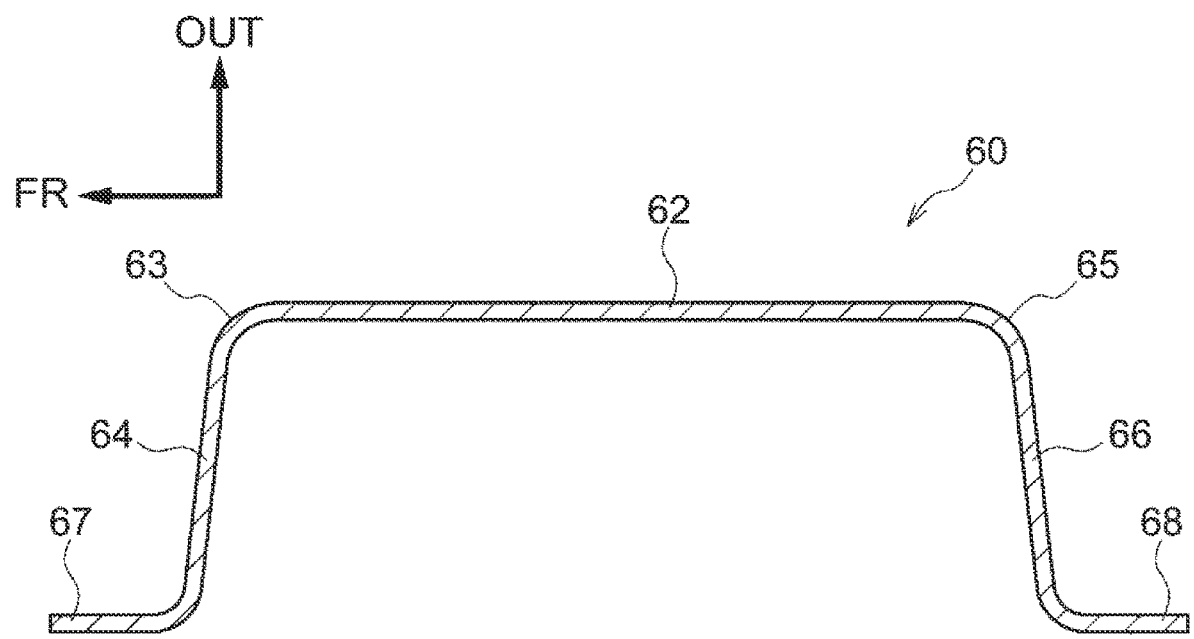
FIG. 7 is a plan sectional view (a sectional view along a line 7-7 in FIG. 3) of a pillar lower portion in the vehicle side structure according to the present embodiment.
Figure 8:
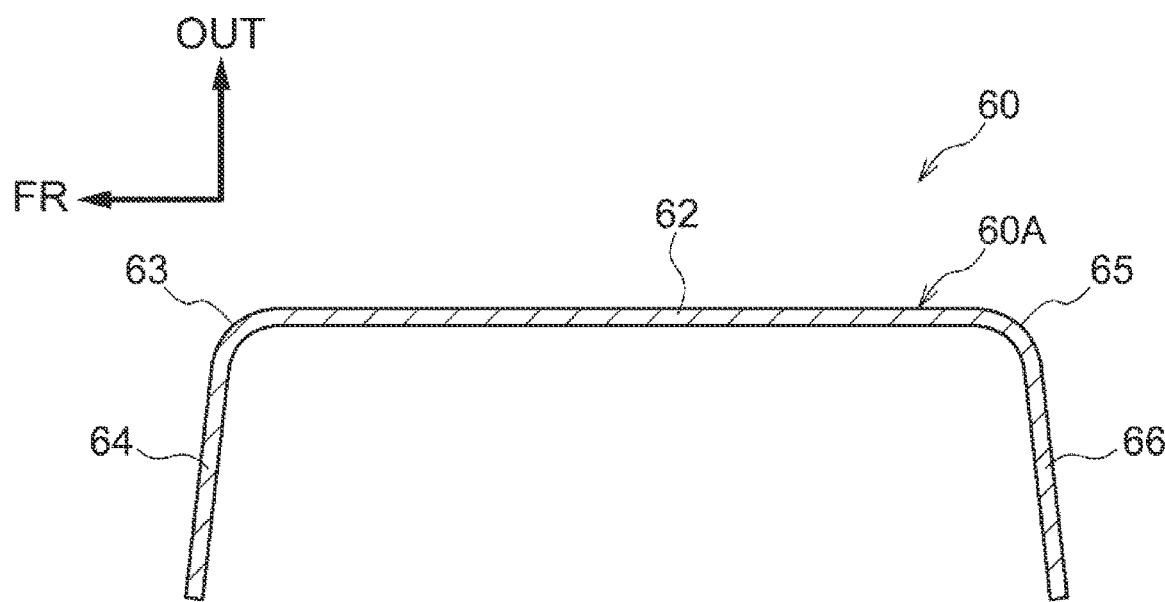
FIG. 8 is a plan sectional view (a sectional view along a line 8-8 in FIG. 3) of an upper part of the pillar lower portion in the vehicle side structure according to the present embodiment.

FIG. 6 is a plan sectional view (a sectional view along a line 6-6 in FIG. 3) of a lower part 40B of the pillar upper portion 40 (described later) in the vehicle side structure 10. FIG. 7 is a plan sectional view (a sectional view along a line 7-7 in FIG. 3) of a pillar lower portion 60 (described later) in the vehicle side structure 10. FIG. 8 is a plan sectional view (a sectional view along a line 8-8 in FIG. 3) of an upper part 60A of the pillar lower portion 60 (described later) in the vehicle side structure 10.

The vehicle side structure 30 illustrated in FIGS. 2, 3, and 4 is a structure applied to the pillar outer panel 32 in the center pillar 16 on the right side of the vehicle 300 (see FIG. 1). As illustrated in FIGS. 2 and 3, the vehicle side structure 10 includes the pillar upper portion 40 constituting an upper part, in the vehicle up-down direction, of the pillar outer panel 32, the pillar lower portion 60 constituting a lower part, in the vehicle up-down direction, of the pillar outer panel 32, and a joining portion 38.

As illustrated in FIG. 2, the pillar upper portion 40 is joined to the roof side rail 22. The pillar lower portion 60 is joined to the rocker 24.

The pillar upper portion 40 is made of a hot stamp material, for example. The hot stamp material is manufactured by hot press working in which a steel sheet is pressed while the steel sheet is heated at a recrystallization temperature or more, so that the hot stamp material can have an ultra-high tension. The tensile strength of the pillar upper portion 40 (except a low strength portion 84 (described later)) is 1500 MPa or more, for example.

The pillar lower portion 60 is made of a cold press material, for example. The cold press material is manufactured by cold press working in which a steel sheet is pressed at a temperature lower than a normal temperature or the recrystallization temperature. The tensile strength of the pillar lower portion 60 is 980 MPa or less, for example. That is, the pillar lower portion 60 has a tensile strength lower than the pillar upper portion 40. The ductility (a property that an object exceeds its elastic limit and stretches without breaking) of the pillar lower portion 60 is higher than the ductility of the pillar upper portion 40. Note that the tensile strength and the ductility generally have such a relationship that, when one of them is higher, the other one of them is lower.

As illustrated in FIG. 5, in a plan sectional view, a sectional shape of the pillar upper portion 40 is a generally hat-shape opened inwardly in the vehicle width direction. More specifically, the pillar upper portion 40 includes an outer wall portion 42, a front wall portion 44, a rear wall portion 46, a front flange portion 47, and a rear flange portion 48.

The outer wall portion 42 is an outer wall constituting an outer part of the pillar upper portion 40 in the vehicle width direction and faces outward in the vehicle width direction. The front wall portion 44 overhangs inwardly in the vehicle width direction from a front end of the outer wall portion 42. The front flange portion 47 overhangs forward in the vehicle front-rear direction from an inner end of the front wall portion 44 in the vehicle width direction.

The rear wall portion 46 overhangs inwardly in the vehicle width direction from a rear end of the outer wall portion 42. The rear flange portion 48 overhangs rearward in the vehicle front-rear direction from an inner end of the rear wall portion 46 in the vehicle width direction.

Note that, as illustrated in FIG. 6, the lower part 40B (see FIG. 3) of the pillar upper portion 40 is not provided with the front flange portion 47 and the rear flange portion 48. That is, in a plan sectional view, the lower part 40B has a generally lateral square-U-shape (generally U-shape) opened inwardly in the vehicle width direction. More specifically, the lower part 40R is constituted by the outer wall portion 42, the front wall portion 44, and the rear wall portion 46. Note that the lower part 40B may not have at least either one of the front wall portion 44 and the rear wall portion 46. That is, the lower part 40B should have at least the outer wall portion 42.

As illustrated in FIG. 7, similarly to the pillar upper portion 40, in a plan sectional view, a sectional shape of the pillar lower portion 60 is a generally hat-shape opened inwardly in the vehicle width direction. More specifically, the pillar lower portion 60 includes an outer wall portion 62, a front wall portion 64, a rear wall portion 66, a front flange portion 67, a rear flange portion 68, a front edge line portion 63 (an example of a first edge line portion), and a rear edge line portion 65 (an example of a second edge line portion).

The outer wall portion 62 is an outer wall constituting an outer part of the pillar lower portion 60 in the vehicle width direction and faces outward in the vehicle width direction. The front wall portion 64 overhangs inwardly in the vehicle width direction from a front end of the outer wall portion 62. The front flange portion 67 overhangs forward in the vehicle front-rear direction from an inner end of the front wall portion 64 in the vehicle width direction. The front edge line portion 63 (an example of the first edge line portion) is provided between the outer wall portion 62 and the front wall portion 64. That is, the front edge line portion 63 is provided in a boundary portion between the outer wall portion 62 and the front wall portion 64.

The rear wall portion 66 overhangs inwardly in the vehicle width direction from a rear end of the outer wall portion 62. The rear flange portion 68 overhangs rearward in the vehicle front-rear direction from an inner end of the rear wall portion 66 in the vehicle width direction. The rear edge line portion 65 (an example of the second edge line portion) is provided between the outer wall portion 62 and the rear wall portion 66. That is, the rear edge line portion 65 is provided in a boundary portion between the outer wall portion 62 and the rear wall portion 66.

Note that, as illustrated in FIG. 8, the upper part 60A (see FIG. 3) of the pillar lower portion 60 is not provided with the front flange portion 67 and the rear flange portion 68. That is, in a plan sectional view, the upper part 60A has a generally lateral square-U-shape (generally U-shape) opened inwardly in the vehicle width direction. More specifically, the upper part 60A is constituted by the outer wall portion 62, the front wall portion 64, and the rear wall portion 66. Note that the upper part 60A may not have at least either one of the front wall portion 64 and the rear wall portion 66. That is, the upper part 60A should have at least the outer wall portion 62.

As illustrated in FIG. 3, the pillar lower portion 60 includes a joining part 69 (an example of a first part) joined to the pillar upper portion 40. The joining part 69 is provided in an upper region including an upper end 60U of the pillar lower portion 60.

In the meantime, the pillar upper portion 40 includes a joining part 49 (an example of a second part) joined to the pillar lower portion 60. The joining part 49 is provided in a lower region including a bottom end 40D of the pillar upper portion 40.

In a state where the joining part 69 overlaps with the inner side of the joining part 49 in she vehicle width direction, the joining part 69 is joined to the joining part 49, so that the joining portion 38 (a shaded part in FIG. 2) in the vehicle side structure 10 is provided. The joining portion 38 is provided, for example, such that the joining part 69 is joined to the joining part 49 by performing spot welding between a part of the joining part 69 and a part of the joining part 49. In the joining portion 38, the joining part 69 and the joining part 49 overlap with each other in a vehicle side view, and it is not necessary that a whole surface of the joining part 69 be joined to a whole surface of the joining part 49.

The joining portion 38 has a through-hole 72 through which a wiring harness (not shown) placed from the center pillar 16 toward the inside of the rear side door 15 is passed. The through-hole 72 is an elongate hole elongated in the up-down direction. Further, the through-hole 72 is a common hole penetrating through the joining part 69 and the joining part 49.

Further, the joining portion 38 has an attachment hole 74 to which an upper hinge (not shown) for supporting the rear side door 15 is attached. The attachment hole 74 is constituted by a pair of holes placed along the vehicle up-down direction. Further, the attachment hole 74 is a common hole penetrating through the joining part 69 and the joining part 49.

Further, the joining portion 38 has an attachment hole 76 to which a lower hinge (not shown) for supporting the rear side door 15 below the upper hinge (not shown) is attached. The attachment hole 76 is constituted by a pair of holes placed along the vehicle front-rear direction. Further, the attachment hole 76 is a common hole penetrating through the joining part 69 and the joining part 49.

In the vehicle side structure 10, a projection (a bead) 82 (an example of a constituent part) is provided in the joining part 69 of the pillar lower portion 60, at a position above the bottom end 40D of the pillar upper portion 40 in the vehicle tip-down direction. The projection 82 projects inwardly in the vehicle width direction, as illustrated in FIG. 4.

More specifically, as illustrated in FIG. 3, the projection 82 is provided in the outer wall portion 62 of the pillar lower portion 60 along the vehicle front-rear direction. Further, the projection 82 includes the front edge line portion 63 and the rear edge line portion 65. Note that the projection 82 may be provided so as to include a region (a region other than the joining part 69), in the pillar lower portion 60, which that is not joined to the pillar upper portion 40.

The projection 82 is placed below the belt line 102 in the vehicle up-down direction in the pillar lower portion 60. Further, the projection 82 is placed below the through-hole 72, the attachment hole 74, and the attachment hole 76 in the vehicle up-down direction in the pillar lower portion 60.

Further, in the vehicle side structure 10, in the joining part 49 of the pillar upper portion 40, a low strength portion 84 having a tensile strength lower than the other part of the pillar upper portion 40 is provided such that the low strength portion 84 is provided at a position above the bottom end 40D of the pillar upper portion 40 in the vehicle up-down direction.

More specifically, the low strength portion 84 is provided in the outer wall portion 42 of the pillar upper portion 40 along the vehicle front-rear direction. Further, the low strength portion 84 is placed in the lower part 40B, of the pillar upper portion 40, in which the front flange portion 47 and the rear flange portion 48 are not provided.

The low strength portion 84 is placed so as to overlap with the projection 82 in a vehicle side view as illustrated in FIG. 2. On this account, the low strength portion 84 is placed at the same height as the projection 82 as illustrated in FIG. 4.

Accordingly, as illustrated in FIG. 3, similarly to the, projection 82, the low strength portion 84 is placed below the belt line 102 in the vehicle up-down direction in the pillar upper portion 40. Further, the low strength portion 84 is placed below the through-hole 72, the attachment hole 74, and she attachment hole 76 in the vehicle up-down direction in the pillar upper portion 40.

The tensile strength of the low strength portion 84 is 980 MPa or less, for example, and the tensile strength of a region, in the pillar upper portion 40, other than the low strength portion 84 is 1500 MPa or more, for example.

Note that the low strength portion 84 should be placed such that at least a part of the low strength portion 84 overlaps with at least a part of the projection 82 in a vehicle side view.

Here, the following describes a manufacturing method of the pillar upper portion 40 including the low strength portion 84.

A first manufacturing method is as follows. That is, a steel sheet is heated and the steel sheet thus heated is subjected to plastic working with a die attached to a press device, and then, a region other than the low strength portion 84 is cooled rapidly by a contact with the die, so that the region other than the low strength portion 84 can have a tensile strength of 1500 MPa or more, for example. Further, a region corresponding to the low strength portion 84 is not cooled rapidly, but is cooled gradually by warming the die, so that the region can have a tensile strength of 980 MPa or less, for example. Hereby, the pillar upper portion 40 including the low strength portion 84 is manufactured.

A second manufacturing method is as follows. That is, a steel sheet is heated and the steel sheet thus heated is subjected to plastic working with a die attached to a press device, and then, the whole pillar upper portion 40 is cooled rapidly by a contact with the die, so that the whole pillar upper portion 40 can have a tensile strength of 1500 MPa or more, for example. After that, a region corresponding to the low strength portion 84 is warmed again to be tempered, so that the region can have a tensile strength of 980 MPa or less. Hereby, the pillar upper portion 40 including the low strength portion 84 is manufactured.

Next will be described effects of the vehicle side structure 10.

In the vehicle side structure 10, as described above, the projection 82 projecting inwardly in the vehicle width direction is provided in the pillar lower portion 60 constituting a lower part, in the vehicle up-down direction, of the pillar outer panel 32. Further, the tensile strength of the pillar lower portion 60 is lower than the tensile strength of the pillar upper portion 40 constituting an upper part, in the vehicle up-down direction, of the pillar outer panel 32.

On this account, at the time of a side collision of the vehicle 100, the pillar lower portion 60 easily deforms inwardly in the vehicle width direction from the projection 82 as a starting point, as illustrated in FIG. 9. That is, at the time of a side collision of the vehicle 100, a deformation (a J-shaped bending mode) easily occurs such that, while an upper part (a part above the projection 82) of the center pillar 16 maintains a posture along the vehicle up-down direction, a lower part (a part below the projection 82) of the center pillar 16 is bent inwardly in the vehicle width direction. Note that, in FIG. 9, in the pillar outer panel 32, a part provided with the projection 82 is surrounded by a broken line AB.

Further, in the vehicle side structure 10, the low strength portion 84 having a tensile strength lower than other parts of the pillar upper portion 40 is provided in the joining part 49, of the pillar upper portion 40, which overlaps with the pillar lower portion 60.

On this account, at the time of a side collision of the vehicle 100, the pillar upper portion 40 easily deforms inwardly in the vehicle width direction from the low strength portion 84 as a starting point. That is, at the time of a side collision of the vehicle 100, a deformation (a J-shaped bending mode) easily occurs such that, while the upper part (a part above the low strength portion 84) of the center pillar 16 maintains a posture along the vehicle up-down direction, the lower part (a part below the low strength portion 84) of the center pillar 16 is bent inwardly in the vehicle width direction. Note that, in FIG. 9, in the pillar outer panel 32, a part provided with the low strength portion 84 is surrounded by a broken line AB.

Particularly, in the vehicle side structure 10, as described above, the low strength portion 84 and the projection 82 are placed at the same height, and therefore, at the time of a side collision of the vehicle 100, the pillar upper portion 40 and the pillar lower portion 60 easily deform inwardly in the vehicle width direction from similar positions as starting points. On this account, in comparison with a case where the low strength portion 84 is placed apart from the projection 82 in a vehicle side view, the J-shaped bending mode easily occurs.

Further, in the vehicle side structure 10, the projection 82 is provided in the front edge line portion 63 and the rear edge line portion 65 of the pillar lower portion 60. Accordingly, in comparison with a case where the projection 82 is provided only in the outer wall portion 62 of the pillar lower portion 60, the pillar lower portion 60 easily deforms inwardly in the vehicle width direction from the projection 82 as a starting point. Accordingly, in comparison with a case where the projection 82 is provided only in the outer wall portion 62 of the pillar lower portion 60, the deformation (the J-shaped bending mode) easily occurs at the time of a side collision of the vehicle 100 such that, while the upper pan (a part above the projection 82) of the center pillar 16 maintains a posture along the vehicle up-down direction, the lower part (a part below the projection 82) of the center pillar 16 is bent inwardly in the vehicle width direction.

Further, in the vehicle side structure 10, as illustrated in FIGS. 2 and 3, the projection 82 and the low strength portion 84 are placed below the belt line 102 in the vehicle up-down direction. On this account, at the time of a side collision of the vehicle 100, the pillar upper portion 40 and the pillar lower portion 60 easily deform inwardly in the vehicle width direction from a position below the belt line 102 in the vehicle up-down direction. That is, a deformation easily occurs at the time of a side collision of the vehicle 100 such that, while a part of the center pillar 16 above the belt line 102 maintains a posture along the vehicle up-down direction, a part of the center pillar 16 below the belt line 102 is bent inwardly in the vehicle width direction.

Accordingly, at the time of a side collision of the vehicle 100, a space can be secured in the vehicle cabin, at a position at least above the belt line 102.

Here, in the vehicle side structure 10, the projection 82 is placed above the bottom end of the pillar upper portion 40, in the joining part 69 (a part overlapping with the pillar upper portion 49) of the pillar lower portion 60. That is, a lower part of the pillar lower portion 60 below the projection 82 (a part bent inwardly in the vehicle width direction in the J-shaped bending mode) overlaps with the pillar upper portion 40. On this account, in comparison with a case where the lower part does not overlap with the pillar upper portion 40, a bending amount of the lower part is reduced. As a result, an entry amount of the center pillar 16 into the vehicle cabin can be reduced.

Further, the low strength portion 84 is placed above the bottom end of the pillar upper portion 40, in the second part of the pillar upper portion 40. That is, a lower part of the pillar upper portion 40 below the low strength portion 84 (a part bent inwardly in the vehicle width direction in the J-shaped bending mode) has a tensile strength higher than the tensile strength of the low strength portion 84. On this account, in comparison with a case where the low strength portion 84 is provided so as to include the lower part, a bending amount of the lower part is reduced. As a result, the entry amount of the center pillar 16 into the vehicle cabin can be reduced.

Further, in the vehicle side structure 10, the pillar upper portion 40 is made of a hot stamp material. The hot stamp material is manufactured by hot press working in which a steel sheet is pressed while the steel sheet is heated at a recrystallization temperature or more, so that the pillar upper portion 40 can have an ultra-high tension (e.g., a tensile strength of 1500 MPa or more). On this account, the pillar upper portion 40 can hardly deform. As a result, the entry amount of the center pillar 16 into the vehicle cabin can be reduced.

Figure 10:
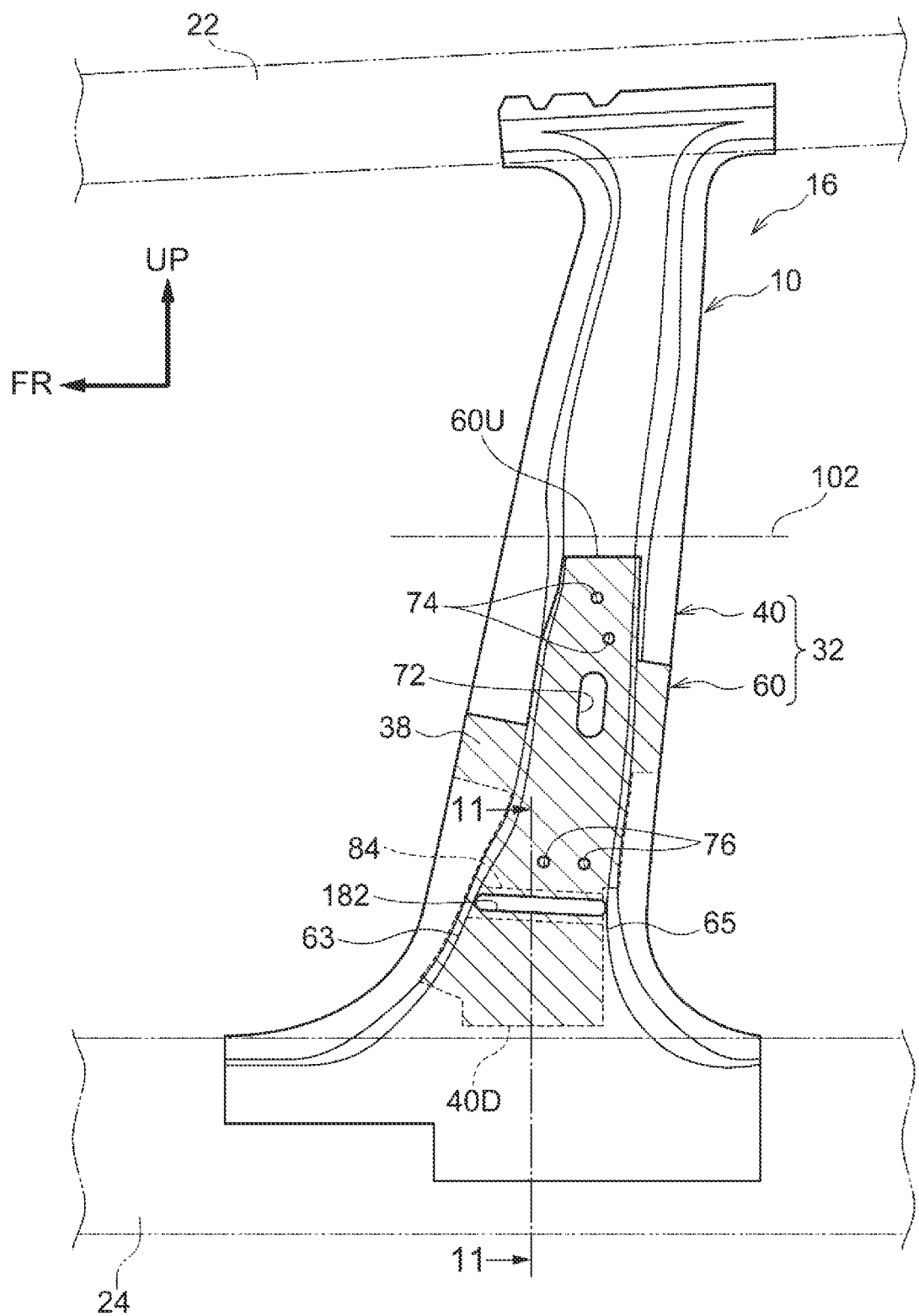
FIG. 10 is a side view of a vehicle side structure according to a modification when it is viewed from the inside of the vehicle.
Figure 11:
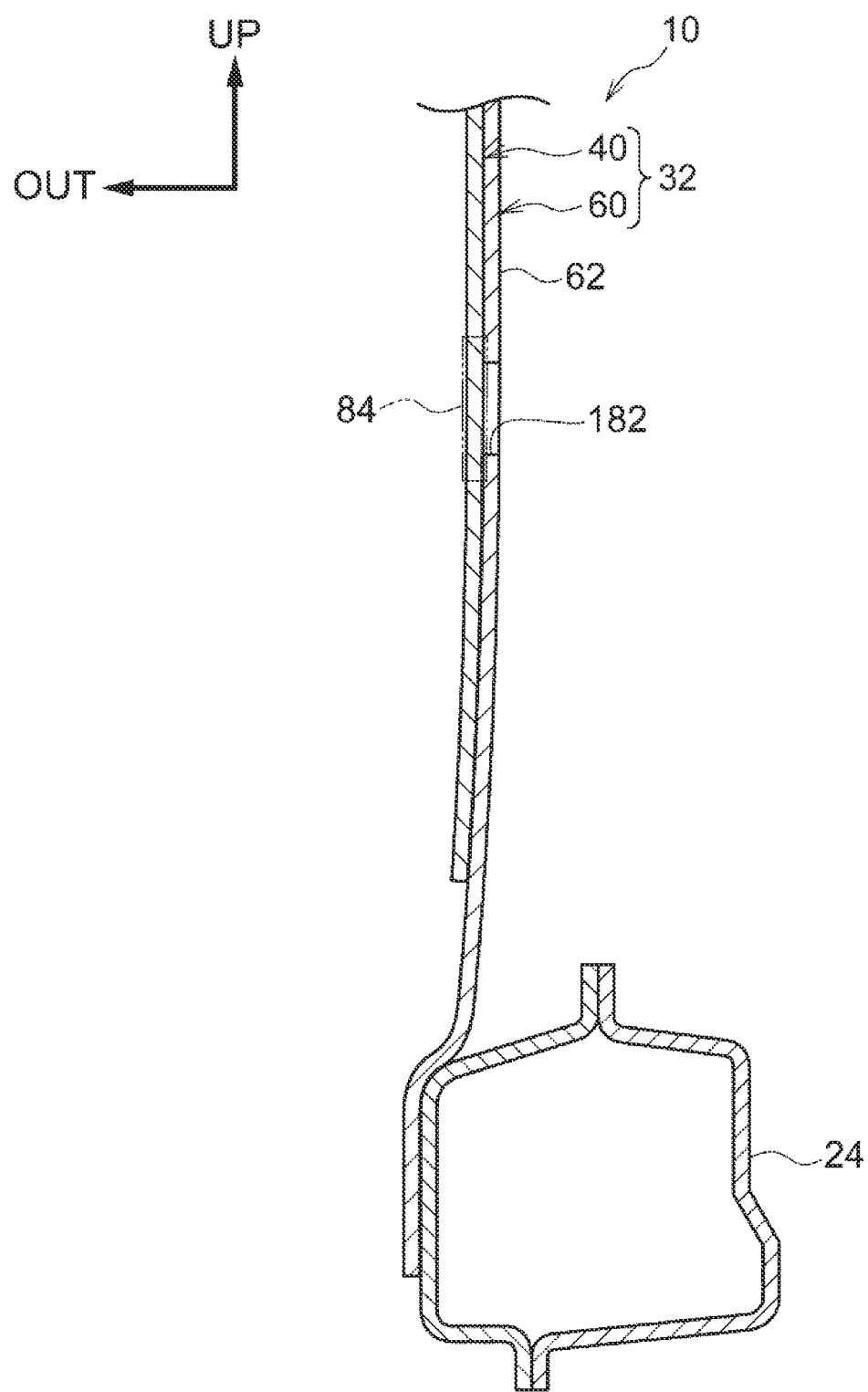
FIG. 11 is a front sectional view (a sectional view along a line 11-11 in FIG. 2) illustrating the vehicle side structure according to the modification.

In the present embodiment, the projection 82 is used as an example of the constituent part, but the disclosure is not limited to this. In view of this, a modification of the vehicle side structure 10 will be described below. The constituent part may be a hole 182 as illustrated in FIGS. 10 and 11. As illustrated in FIG. 10, the hole 182 may be an elongate hole provided along the vehicle front-rear direction, for example.

Further, similarly to the case of the projection 82, the hole 182 is placed below the belt line 102 in the vehicle up-down direction, in the pillar upper portion 40. Further, the hole 182 is placed below the through-hole 72, the attachment hole 74, and the attachment hole 76 in the vehicle up-down direction in the pillar upper portion 40.

As illustrated in FIG. 11, the hole 182 is provided in the pillar lower portion 60 and is not provided in the pillar upper portion 40, as illustrated in FIG. 11. That is, the hole 182 is not a common hole, but one end side of the hole 182 is covered with the low strength portion 84 of the outer wall portion 42 of the pillar upper portion 40 from the outer side in the vehicle width direction. In other words, the one end side of the hole 182 faces the low strength portion 84 of the outer wall portion 42. Note that the hole 182 may be configured such that a plurality of round holes or the like is placed along the vehicle front-rear direction.

Like the modified embodiment, even in a case where the hole 182 is provided instead of the projection 82, at the time of a side collision of the vehicle 100, the pillar lower portion 60 easily deforms inwardly in the vehicle width direction from the hole 182 as a starting point, similarly to the case of the projection 82. Accordingly, even in a case where the hole 182 is provided instead of the projection 82, it is possible to obtain the same effect as in the case of the projection 82.

The disclosure is not limited to the above embodiment and modification, and various modifications, alterations, and improvements can be made within a range that does not deviate from the gist of the disclosure.

What is claimed is:

1. A vehicle side structure comprising:
   a pillar upper portion constituting, in a side portion of a vehicle, an upper part in a vehicle up-down direction in a pillar outer panel as an outer plate of a center pillar extending along the vehicle up-down direction, the pillar upper portion being joined to a roof side rail extending along a vehicle front-rear direction;
   a pillar lower portion constituting a lower part, in the vehicle up-down direction, of the pillar outer panel, the pillar lower portion being joined to a rocker extending along the vehicle front-rear direction, the pillar lower portion having a tensile strength lower than the pillar upper portion;
   a joining portion where a first part including an upper end of the pillar lower portion is joined to a second part including a bottom end of the pillar upper portion in a state where the first part overlaps with an inner side of the second part in a vehicle width direction; and
   a constituent part provided in the first part of the pillar lower portion, at a position above the bottom end in the vehicle up-down direction, the constituent part including one of a projection projecting inwardly in the vehicle width direction or a hole.

2. The vehicle side structure according to claim 1, wherein the hole is an elongate hole provided along the vehicle front-rear direction.

3. The vehicle side structure according to claim 1, wherein the second part of the pillar upper portion is provided with a low strength portion having a tensile strength lower than other parts of the pillar upper portion, the low strength portion being provided at a position above the bottom end in the vehicle up-down direction.

4. The vehicle side structure according to claim 3, wherein the low strength portion is placed so as to overlap with at least a part of the constituent part in a vehicle side view.

5. The vehicle side structure according to claim 3, wherein the low strength portion and the constituent part are placed below a belt line of the vehicle in the vehicle up-down direction.

6. The vehicle side structure according to claim 5, wherein the belt line is a line passing through a door-panel upper end of the vehicle.

7. The vehicle side structure according to claim 1, wherein:
   the pillar lower portion includes a first edge line portion provided between an outer wall portion of the pillar lower portion, facing outward in the vehicle width direction, and a front wall portion overhanging inwardly in the vehicle width direction from a front end of the outer wall portion;
   the pillar lower portion includes a second edge line portion provided between the outer wall portion and a rear wall portion overhanging inwardly in the vehicle width direction from a rear end of the outer wall portion; and
   the constituent part is provided in the first edge line portion and the second edge line portion.

8. The vehicle side structure according to claim 1, wherein the pillar upper portion is made of a hot stamp material.

9. The vehicle side structure according to claim 8, wherein the hot stamp material is manufactured by hot press working in which a steel sheet is pressed while the steel sheet is heated at a recrystallization temperature or more.

* * * * *

UNITED STATES PATENT AND TRADEMARK OFFICE
CERTIFICATE OF CORRECTION

PATENT NO. : 10,953,927 B2
APPLICATION NO. : 16/206096
DATED : March 23, 2021
INVENTOR(S) : Yoshiaki Nakamoto and Naohiko Ueno It is certified that error appears in the above-identified patent and that said Letters Patent is hereby corrected as shown below:

In the Specification

In Column 2, Line(s) 50, delete "pan" and insert --part--, therefor.

In Column 4, Line(s) 57, delete "die" and insert --the--, therefor.

In Column 5, Line(s) 24, delete "or" and insert --on--, therefor.

In Column 5, Line(s) 52, delete "s" and insert --a--, therefor.

In Column 5, Line(s) 59, after "below" and insert --.--, therefor.

In Column 6, Line(s) 10, after "structure", delete "30" and insert --10--, therefor.

In Column 7, Line(s) 3, delete "40R" and insert --40B--, therefor.

In Column 7, Line(s) 64, delete "she" and insert --the--, therefor.

In Column 8, Line(s) 33, delete "tip-down" and insert --up-down--, therefor.

In Column 8, Line(s) 65, after "the" delete ",".

In Column 9, Line(s) 3, delete "she" and insert --the--, therefor.

In Column 10, Line(s) 34, delete "pan" and insert --part--, therefor.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*